United States Patent [19]

Lippman et al.

[11] Patent Number: 5,423,454
[45] Date of Patent: Jun. 13, 1995

[54] METHOD OF PROPELLANT GAS GENERATION

[76] Inventors: Lawrence G. Lippman, deceased, late of East Amherst, N.Y.; by Cindy Culverwell, administrator, 5655 Newhouse Rd., East Amherst, N.Y. 14051

[21] Appl. No.: 931,478

[22] Filed: Aug. 19, 1992

[51] Int. Cl.$^6$ .............................................. B65D 83/14
[52] U.S. Cl. ........................................ 222/1; 204/271; 204/DIG. 6; 222/386.5
[58] Field of Search ................... 222/4, 1, 389, 386.5; 204/270, 271, 278, DIG. 6

[56] References Cited

U.S. PATENT DOCUMENTS

| | | | |
|---|---|---|---|
| 3,115,280 | 12/1963 | Battista | 222/95 |
| 3,669,320 | 6/1972 | Purcell, Jr. | 222/389 |
| 3,842,939 | 10/1974 | Satzinger | 222/389 X |
| 3,894,538 | 7/1975 | Richter | 222/95 X |
| 4,023,648 | 5/1977 | Orlitzky et al. | 222/389 X |
| 4,247,410 | 1/1981 | Bernat | 222/4 |
| 4,360,131 | 11/1982 | Reyner | 222/386.5 |
| 4,376,500 | 3/1983 | Banks et al. | 222/386.5 |
| 4,478,044 | 10/1984 | Magid | 60/721 |
| 4,510,734 | 4/1985 | Banks et al. | 53/449 |
| 4,513,884 | 4/1985 | Magid | 222/94 |
| 4,531,341 | 7/1985 | Bittner | 53/117 |
| 4,553,685 | 11/1985 | Magid | 222/1 |
| 4,594,834 | 6/1986 | Schmidt et al. | 53/117 |
| 4,611,457 | 9/1986 | Bittner | 53/429 |
| 4,621,483 | 11/1986 | Magid | 53/455 |
| 4,641,485 | 2/1987 | Schmidt et al. | 53/429 |
| 4,671,386 | 6/1987 | Orlitzky | 222/389 X |
| 4,679,706 | 7/1987 | Magid et al. | 222/130 |
| 4,696,145 | 9/1987 | Schmidt et al. | 53/436 |
| 4,744,442 | 5/1988 | Bras et al. | 222/389 X |
| 4,857,029 | 8/1989 | Dierick et al. | 446/220 |
| 4,885,076 | 12/1989 | Smith et al. | 204/299 R |
| 4,886,514 | 12/1989 | Maget | 604/891.1 |
| 4,896,794 | 1/1990 | Banks et al. | 222/1 |
| 4,902,278 | 2/1990 | Maget et al. | 604/891.1 X |
| 4,964,540 | 10/1990 | Katz | 222/95 |
| 4,971,669 | 11/1990 | Wrede et al. | 204/129 |
| 5,090,963 | 2/1992 | Gross et al. | 222/494 X |

*Primary Examiner*—Andres Kashnikow
*Attorney, Agent, or Firm*—Jacobson, Price, Holman & Stern

[57] ABSTRACT

A method for dispensing a product which comprises electrochemically generating a gas and utilizing the pressure of the gas to dispense the product. More specifically, the method may comprise electrochemically generating a gas by providing an electrolyte mixture which will react in the presence of an electrical current to form at least one gas, providing an electrical current through the mixture to cause reaction to form the gas, using the gas to form an internal pressure against a confined product to be dispensed thus forcing the product through a passage to an area having an exterior pressure lower than the internal pressure. The apparatus for accomplishing the method may comprise an electrochemical gas generator, a container containing a product and structure for utilizing pressure of gas generated by the generator to dispense product from the container. The gas generator comprises an electrolyte mixture which will react in the presence of an electrical current to provide at least one gas. The apparatus may further comprise structure for using the confined gas to form an internal pressure against the product to be dispensed.

23 Claims, 8 Drawing Sheets

ELECTRICAL CONNECTIONS

FIG. 5A

GRAPHITE-IMPREGNATED POLYMER WITH PERFORATIONS FOR GAS TO ESCAPE

OPEN-CELL FOAM IMPREGNATED WITH ELECTROLYTE GEL

METHOD OF PROPELLANT GAS GENERATION

BACKGROUND OF THE INVENTION

Shortly after World War II the first aerosol dispensers were introduced. Propane was the propellant and it delivered insecticide. The use of propane required a container with a burst pressure near 300 pounds per square inch (psi) since the vapor pressure of propane at room temperature is about 190 psi, a relatively high pressure, and in many ways unsafe, but tolerable in its time.

About 1955 the market for this aerosol method of dispensing began to increase rapidly with the introduction of chlorinated fluorocarbons (CFCs) which were regarded as an ideal propellant. CFCs are non-flammable, non-toxic, relatively inexpensive, capable of a wide range of propellant formulations to give any desired vapor pressure, and soluble in a wide variety of product formulations.

Aerosol spray containers soon became widely used to deliver a broad range of materials of various compositions and properties to the point of use. Products which employ this system are numerous and include such products as hair sprays, colognes, tanning aids, medicinals, waxes and polishes, foods, adhesives and paints.

In the 1970s it became believed that a build-up of CFCs in the atmosphere was damaging the ozone layer which surrounds the earth. This envelope absorbs a great deal of the sun's radiation in the ultra-violet region. Ultra-violet radiation can cause human skin cancer, eye diseases and other ailments, and can also lead to increased damage to crops and fish.

CFCs are produced from non-aerosol applications as well; however, the environmental impact of CFCs in these applications is uneven since they are subjected to varying levels of containment and control. Aerosols, however, are the only application where the CFC is deliberately expelled to the atmosphere with no attempt at scavenging or recycling. This, together with the availability of alternative dispensing methods, made this application a prime target for legislative control, once the severity of the environmental impact became clear.

In 1979, the U.S. government passed laws providing for the elimination of CFCs in aerosol dispensers. Recently, other countries have moved to curtail, and eventually prohibit, their production.

In addition to their possible impact on the ozone layer, it is now believed that CFCs are also significant contributors to the greenhouse effect (a long-term warming trend in the earth's atmosphere). The search for alternatives to CFCs has been difficult.

To be useful, a propellant should have a vapor pressure higher than 10–20 psi at room temperature so that it will be effective over the full range of product viscosities; from perfumes at one end of the range to shaving gels at the other. At the same time, because the can will sometimes become overheated thus causing pressure increase, the propellant must be contained at temperatures up to 120° F. without making the container so heavy as to be unwieldy. And of course, costs must be as low as possible.

Systems were developed to generate gas by chemical reaction on an as-needed basis. One such system consists of a can within which is a flexible membrane holding the product to be dispensed. In the bottom of the can is a liquid which is one component of the binary mixture needed to generate gas. The membrane is fastened to the wall of the can with an adhesive which contains the other component needed for the gas-generating reaction. As the product is dispensed, the membrane collapses upward, exposing the adhesive to the liquid in the bottom of the can and generating more gas. Once dispensing stops the pressure builds up, compressing the unused product until no more fresh adhesive is exposed and the gas-generating reaction is thereby stopped. This system has never received wide-spread use, chiefly because of practical problems. When the can is laid on its side, the membrane can sag a bit, exposing more adhesive and generating more gas. Eventually, the reaction makes its way up the side of the can until either the can's burst pressure is exceeded, or product is trapped below a zone of high pressure in the top of the can and cannot be dispensed. A number of patents have issued in the area, despite the fact that such systems, in general, have not been commercially practical. See e.g., U.S. Pats. 4,896,794; 4,857,029; 4,696,145; 4,679,706; 4,641,485; 4,621,483; 4,611,457; 4,594,834; 4,553,685; 4,531,341; 4,513,884; 4,510,734; 4,478,044; 4,376,500; and 4,360,131.

A more recent invention relies on the elasticity of rubber to provide the propelling force. A vertically pleated flexible bottle is fitted with a valve, and then inserted inside a rubber sleeve. This assembly is placed inside a retaining display container and sealed. Product is forced past the valve and into the flexible bottle, expanding it and the surrounding rubber sleeve. In this way, energy is stored in the rubber sleeve which expels the product when the valve atop the flexible bottle is opened. This system is limited in its capabilities by the strength and resilience of the rubber sleeve. There is also concern that the elastomer used in the flexible bottle and the rubber sleeve may deteriorate in contact with some products and thus exhibit limited shelf life. Such a system is described in U.S. Pat. No. 4,964,540.

Organic gases were considered and eventually yielded useful propellants but, as a class, these materials suffer from some important disadvantages. Those organic gases that have vapor pressures suitable for propellant use at room temperature have rather steep pressure gradients, so that the internal pressure at 120° F. is relatively high, requiring a stronger and more expensive container than would otherwise be the case. In addition, most organic gases are flammable and form explosive mixtures with air. Another disadvantage is that many organic propellants, such as isobutane, readily diffuse through polymers, especially those of a thermo-formed nature, with the result that the use of plastic as a container material is largely precluded, strength and safety issues aside. Finally, many organic propellants have a latent heat of vaporization and other thermodynamic characteristics such that the temperature of the aerosolized product stream is lowered significantly below ambient, thus reducing the efficiency of aerosolization and requiring a high ratio of propellant to product.

Among the organic gases, isobutane and propane were the most suitable. Mixtures of these gases permitted a range of vapor pressure to meet the needs imposed by widely varying product viscosity. Even so, they presented some serious problems. At room temperature isobutane has a vapor pressure of about 32 psi. This is quite high and led to problems in closing the container. For a time, the problem was addressed by refrigerating the filling environment. This lowered the vapor pressure of the propellant and facilitated can closing, but was expensive. Currently, filling is accomplished principally by forcing the propellant mixture in through the valve. Effective but also expensive, in that it requires special filling equipment. In addition, at 120° F., the vapor pressure of isobutane is 92 psi. This is a fairly high pressure for a hand-held consumer product and the container must have adequate strength. Designed burst pressure is 130 psi. These factors made it very difficult to design a plastic container that would be safe and cost effective. Steel has an adequate strength-to-weight ratio and is relatively inexpensive but cannot be adequately deep drawn, with the result that the top, bottom and side seams must all be welded, adding to cost. Aluminum can be deep drawn so only the top must be welded, but the material itself is relatively expensive. With either material, the cost of adequate containment is substantially higher than with CFCs.

Finally, isobutane and propane are both flammable and form explosive mixtures with air. This led to two expensive consequences. First, the filling equipment and the filling room had to be made explosion-proof, at considerable expense. For some producers, the cost was prohibitive and the introduction of these propellants led to a substantial growth in those companies which do contract filling; a very unsatisfactory condition for affected producers who were now required, for economic reasons, to lose control of a part of the manufacturing process, while their name remained on the package. Second, product liability risks were greatly increased at every step of manufacturing, distribution and use.

Clearly, the successors to CFCs have required some very substantial trade-offs in terms of cost, safety and effectiveness.

There are many non-aerosol applications where product dispensing utilizing gas pressure would be desirable. For example, in traditional deodorant systems, a wick is immersed in a deodorant solution. A small battery-powered fan blowing air over the wick may be used to help evaporate the solution. Energy consumption for the fan motor is high so frequent battery replacement is needed. Also, operation is continuous so deodorant is dispensed whether the facilities are in use or not. A spring-wound device which periodically depresses the actuator of an aerosol dispenser, releasing deodorant into the room may be utilized in place of the wick. However, the need to rewind the timing device makes this product somewhat inconvenient to use.

Therefore, there still exists a need for gas generation cell which is a safe, practical and environmentally acceptable means for product dispensing using gas, whether in the form of an aerosol or otherwise.

SUMMARY OF THE INVENTION

The invention comprises a method and apparatus for dispensing a product. The method comprises electrochemically generating a gas and utilizing pressure of the gas to dispense the product. The apparatus comprises means for accomplishing the method.

The quantity of gas which is generated may be a quantity which is sufficient to reach a predetermined dispensing pressure which is usually determined by the selection or setting of an installed pressure switch to stop the electrochemical generation when the predetermined pressure is reached.

Dispensing may, however, occur as the gas is generated, in which case electrochemical generation may be initiated in response to other stimuli, e.g., pH, chlorine ion concentration, sugar content, pulse variations and electrical conductivity.

More specifically, the method may comprise electrochemically generating a gas by providing an electrolyte mixture which will react in the presence of an electrical current to form at least one gas, providing an electrical current through said mixture to cause reaction to form said gas, using said gas to form an internal pressure against a confined product to be dispensed and opening a passage from the product to an area having an exterior pressure lower than the internal pressure, to permit said internal pressure to force said product through said passage.

More specifically, the apparatus may comprise an electrochemical gas generator, a container containing a product and means for utilizing pressure of gas generated by the generator to dispense product from the container. The gas generator comprises an electrolyte mixture which will react in the presence of an electrical current to provide at least one gas; a means for supplying said current to cause reaction to form the gas; and means for confining the gas.

The apparatus may further comprise means for using the confined gas to form an internal pressure against said product to be dispensed; an openable passage, from the inside of the container for the product, to an area having an external pressure lower than the internal pressure and means to open the passage to permit the internal pressure to force the product through the passage.

BRIEF DESCRIPTION OF THE DRAWINGS

For a further understanding of the invention as well as its characterizing features, reference should now be made to the following detailed description thereof taken in conjunction with the accompanying drawings wherein.

DETAILED DESCRIPTION OF THE INVENTION

The present invention includes a method for the generation of a propellant gas, for dispensing products, e.g., aerosols, by electrochemical means through the electrolysis of a chemical mixture. The chemical mixture comprises a chemical composition which will react to form a gaseous product upon application of an electrical current. The electrochemical reaction may be the electrochemical reaction of two components to form a gaseous reaction product but is commonly an electrochemical decomposition reaction of a compound.

Usually, product is dispensed in accordance with the invention by electrochemically generating gas by providing an electrolyte mixture which will react in the presence of an electrical current to form at least one gas, providing an electrical current through the mixture to cause reaction to form gas, using the gas to form an internal pressure against a confined product to be dispensed through a passage from the product to an area having an exterior pressure lower than the internal pressure to permit the internal pressure to force the product through the passage.

The gas may be confined to produce a relatively high internal pressure while the passage is closed. The passage may then be opened to permit the pressure to force the product through the passage.

The electrolyte mixture and product may be intermixed but are usually confined within a container wherein the electrolyte mixture and product are in areas separated by at least one movable wall and the internal pressure moves the wall against the product to force the product through a passage to the exterior of the container when the passage is opened.

There are several electrochemically-induced reactions which will produce a suitable propellant gas.

Essentially any gas-generating electrolytic reaction may be used in accordance with the present invention provided that it is suitable, i.e., the current requirement must be low enough, the reactants and reaction products must be sufficiently benign, the system must be sufficiently stable and sufficient gas must be provided, all to meet the requirements of the particular application.

The reactants and reaction products in most cases should be sufficiently benign in the sense that they should be non-toxic and non-carcinogenic and should not cause significant environmental hazard. It is further desirable that the reaction products be non-flammable and non-explosive. Some toxicity may be tolerated for some systems, e.g., disinfecting applications, where the gas generated, e.g., chlorine, is considered toxic at a sufficiently high concentration.

The system should be stable in the sense that in the absence of applied current, significant autoreaction (e.g., auto-decomposition) should not occur under normally encountered environmental conditions. Further, the reactants and reaction products should not significantly corrode or otherwise adversely affect their containment means. In most applications, the system should be stable to at least 120° F.

The gas generation requirements depend upon the application. For example, rapid generation is required when an aerosol is to be rapidly emptied, e.g., in the case of spray paints or insecticide dispensers, but less rapid generation is required where dispensing is used slowly or intermittently, e.g., in the case of deodorant or shaving cream. For most common aerosol applications, a gas pressure of between 10 and 40 psi is common; although for special applications, e.g., certain bearing lubrications or pressure washing applications, as much as 1000 psi or more may be obtainable and used in accordance with the invention.

Figure 4:
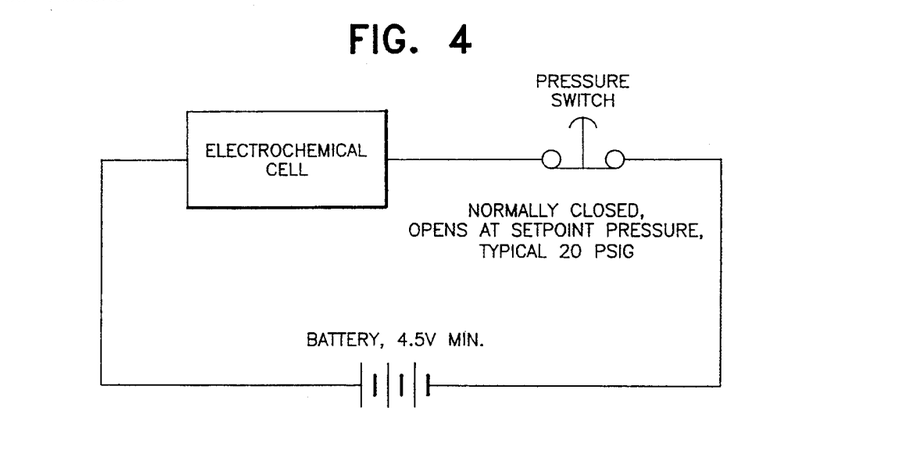
FIG. 4 shows a schematic diagram of electrolytic gas generation for a dispensing container.

The pressure is often, but not always, controlled by a pressure switch. In particular, the electrical current to the electrolyte is provided by closing a switch in series with an electrical source when the internal pressure falls below a minimum predetermined limit to cause gas generation and the switch is opened to stop formation of the gas when the internal pressure exceeds a maximum predetermined limit. A schematic diagram of such a system is shown in FIG. 4.

Depending upon the application, the maximum pressure limit may vary from 10 psi or lower to as much as 1000 psi or higher and the minimum pressure limit is usually less than 10% lower than the maximum pressure limit. "psi" as used herein means gauge pressure.

In the case of aerosols, electrochemical propellant gas generation may occur solely within the aerosol product container.

Essentially, any suitable gas generation chemistry may be used provided that it meets the system requirements.

An example of such a system is the electrochemical generation of nitrogen by electrolysis of a water soluble azide such as alkali metal azide, e.g., sodium azide. A particular formulation, suitable for use in accordance with the invention comprises sodium azide, sodium hexanoate and salts of hydrazine in alkaline aqueous solution at a pH of from 9 to 12. The system generates nitrogen, 1-azidopentane and decane. Nitrogen gas generation is desirable since it is non-toxic, non-reactive and non-flammable.

One of the most efficient systems for use in accordance with the invention is the Kolbe reaction. The Kolbe reaction comprises the electrolysis of a carboxylic acid (e.g., acetic acid) or a carboxylic acid salt (e.g., alkali metal carboxylates such as sodium acetate), to produce an ester, along with carbon dioxide as the principal gaseous product and small amounts of methane, ethane and hydrogen, e.g., $2RCO_2^{2e-} \rightarrow 2CO_2 + R\text{---}R$, where R is usually a hydrocarbon or substituted hydrocarbon. Where R is a substituted hydrocarbon the substituents are selected so as not to interfere with the reaction. The Kolbe reaction has been used to manufacture esters. The Applicant herein is aware of no other prior use of this reaction.

When the Kolbe reaction is used for the purpose of the present invention, the carboxylic acids usually, but not essentially, have from 2 to 10 carbon atoms. Long chain carboxylic acids provide fewer reactive groups per volume of material than short chain carboxylic acids having the same functionality.

The principal propellant gas generated by the Kolbe reaction is carbon dioxide, which is non-toxic, non-flammable, does not support combustion, does not form explosive mixtures with air or any other gas, and is a natural component of the atmosphere. Secondary gases such as ethane and hydrogen are also generated by the Kolbe invention, but their generated quantity, in comparison to that of carbon dioxide, is too small to be of significance in a safety or environmental context. Furthermore, the quantity of carbon dioxide is so much greater than that of ethane and hydrogen that no combustion of these gases is possible.

Typical chemical constituents may be similar to sodium acetate, acetic acid, methylcellulose and water. Sodium acetate is not regarded as hazardous and will not decompose into toxic or otherwise hazardous substances. Furthermore, the amount of these substances in the gas generation cell is too small to be toxic if ingested. Acetic acid, in the anticipated quantity, as diluted by the water that is present, is non-flammable, and not much lower in pH than household vinegar. Typically, from 4N to 6N aqueous acetic acid is used in conjunction with from 2 to 6 percent alkali metal acetate.

Thickening or gelling agents may be used. Methylcellulose is a thickening or gelling agent which is biologically inert. Methylcellulose is commonly used as a food additive for its thixotropic properties.

When using the Kolbe reaction, the exhausted gas generation cell should contain relatively harmless esters such as methyl acetate in an excess of acetic acid and sodium acetate. Driving the gas generation cell beyond its normal end-point may result in some sodium hydroxide formation but not enough to raise the pH beyond 9.0, which is less than that of most soaps.

In a variation of the Kolbe reaction, a mixture of propionic acid and potassium propionate, may be electrolytically reacted to form 63 mole percent carbon dioxide, 15 mole percent butane, 14 mole percent ethane and 6 mole percent ethylene for almost 98% gaseous product yield. Since the major product is still carbon dioxide, the flammability of the other gaseous products is suppressed by its presence, with all of the gaseous products functioning as propellant.

In another variation of the Kolbe reaction, the use of dicarboxylic acids, dicarboxylic acid salts, hydroxy acids and hydroxy acid salts with suitable ancillary agents, as subsequently described, can yield 2 or 3 molecules of carbon dioxide per electron transfer. Such systems are desirable when rapid gas regeneration is required.

Conducting the Kolbe type reaction in a mixture of methanol and water improves efficiency over water alone. The efficiency of the reaction may be further improved through the presence of foreign anions such as bicarbonate, dihydrogen phosphate, fluoride and sometimes sulfate. These anions may be furnished as alkali or alkaline earth metal salts of sodium, potassium, calcium and barium. Such cations have not been found to have a significant deleterious effect. The system should, however, be essentially free of cations of cobalt, copper, iron, lead and manganese since even low concentrations of these metals have a deleterious effect. "Essentially free" as used herein means that there is an insufficient quantity to cause a significant negative effect.

The efficiency of the reaction may be improved by using an electrocatalyst such as N-hydroxyphthalimide which can completely suppress hydrogen formation and yield an additional molecule of carbon dioxide per electron. Another electrocatalyst which may be used is 2,2,6,6-tetramethylpiperidinoxyl.

Aromatic acids and aromatic acid salts, such as benzoic acid and benzyl acetate may be utilized in Kolbe type reactions. In general, however, it is desirable to avoid such aromatics in reaction mechanisms where aromatics such as benzene are generated.

For aerosol applications using the Kolbe reaction, it is desirable that the minimum electrical potential for activation, i.e., the lowest voltage at which the desired reactions begin, be between 2.1 and 3.0 volts. The current density is usually from 0.15 to 3 amperes per $cm^2$ and preferably the current density is in the area of 0.25 ampere per $cm^2$.

Figure 1:
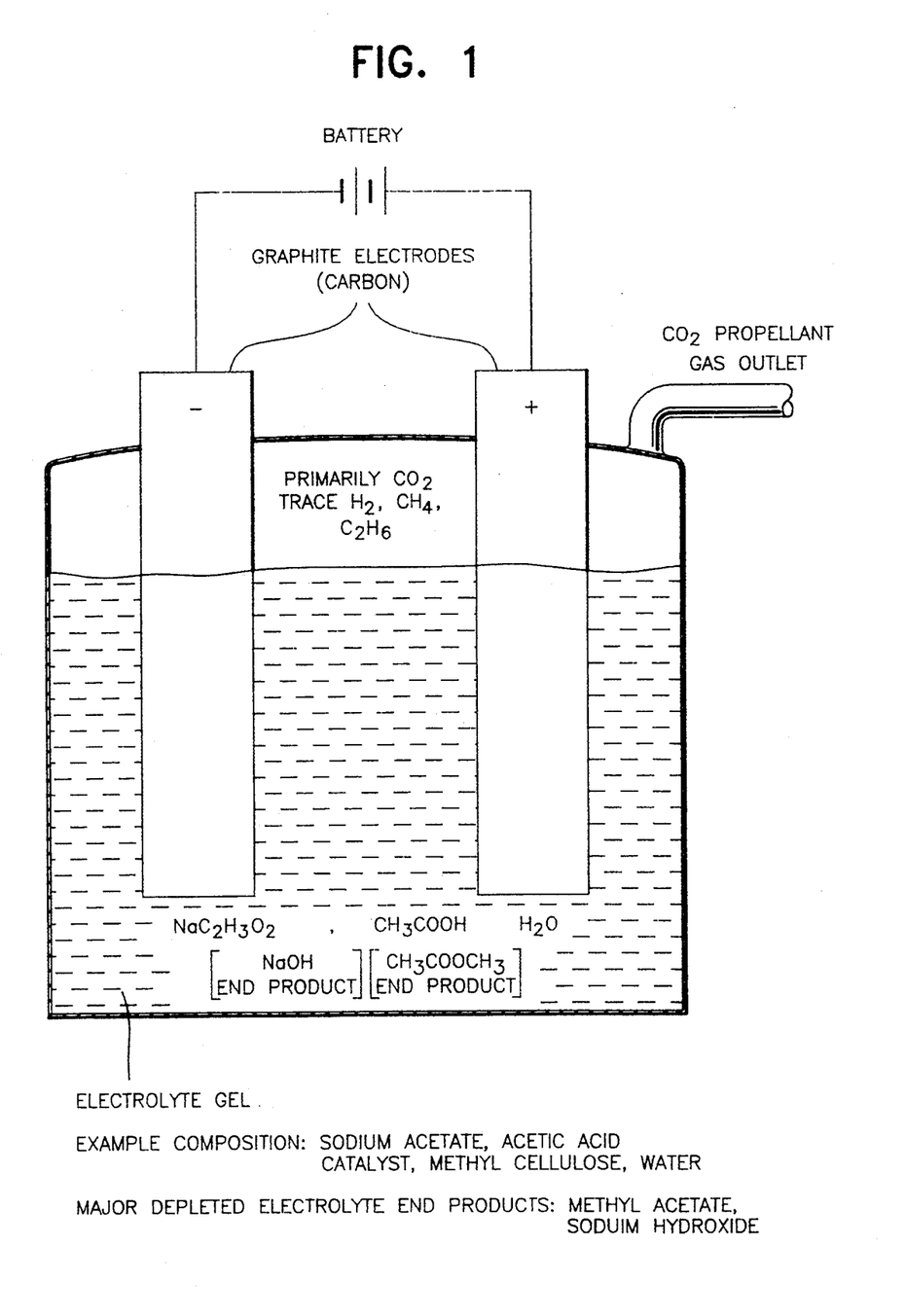
FIG. 1 is a schematic diagram showing the basic components of an electrolyte cell showing the electrolytic generation of $CO_2$ from sodium acetate.

FIG. 1 is a schematic diagram showing the basic components of an electrochemical gas generating cell.

Figure 5:
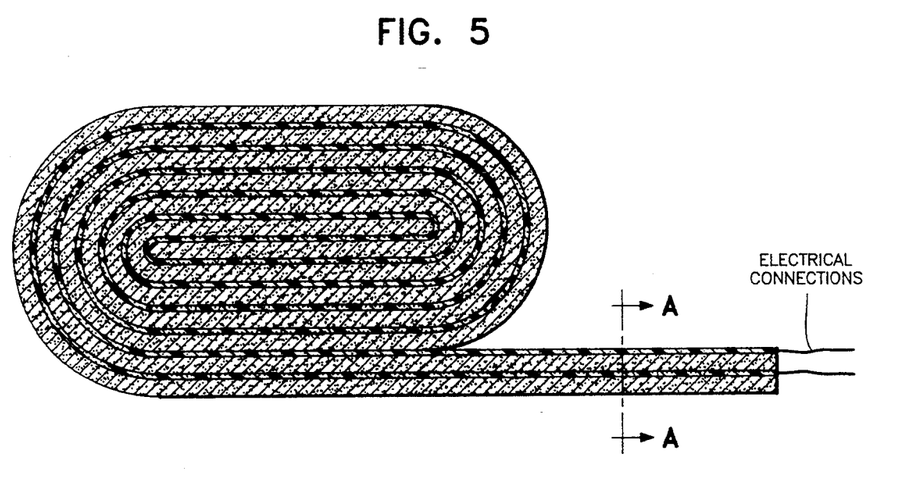
FIG. 5 shows an embodiment of an electrolytic cell for use in accordance with the present invention.
Figure 5A:
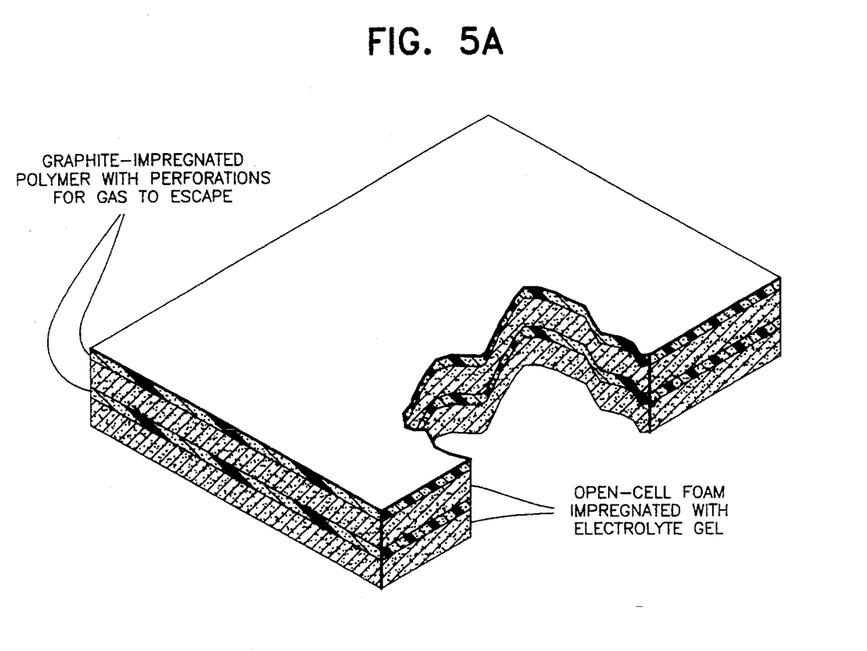
FIG. 5A shows a perspective cross sectional view of the cell of FIG. 5.

The typical Gas Generation Cell (GGC), consists of two perforated electrodes of a suitable material such as thin plastic which are impregnated with graphite or corrosion resistant metal. These electrodes are desirably separated by a porous divider, which is usually electrically insulating, such as porous plastic insulating foam or perforated polymer film, and the entire electrode assembly is wrapped in a sandwich form, similar to a film capacitor. Open cell foam has the advantage of functioning as a reservoir for electrolyte material. This design is intended to combine maximum electrode surface area with minimum cell volume. The GGC is filled with an electrolyte, preferably in gel form to ensure that during changes in container attitude the electrode surfaces are always covered with electrolyte, and the gas generation performance of the GGC is not impaired. One side of the GGC is sealed with a semi-permeable membrane, such as a thin gas permeable film, which will allow gas to escape, while containing the electrolyte. Examples of suitable permeable films can be made from cellulose acetate, polyvinyl alcohol, polyurethane, polyvinyl butyral or polychlorotrifluoroethylene. FIGS. 5 and 5A show the construction of such a GGC.

A battery may be used to supply the electrical energy needed to power the electrochemical gas generation cell. This battery will have rather severe performance requirements since it must provide high discharge currents when needed, while remaining stable over long periods of time with respect to its total ampere-hour capacity. Suitable battery technology is found in cells using carbon-zinc, alkaline-manganese, or lithium-manganese systems. Standard batteries already manufactured are within the required area of performance. If chemistry based upon the Kolbe reaction is used, an 8-ounce container will require an electron transfer of about 2,470 coulombs or 0.69 ampere-hours at a minimum of 3 volts, to effect total dispensing of the product. Commercial batteries are already offered in a size and ampere-hour capacity which are suitable for the module. Standard battery product physical configuration is not desirable but custom package designs are well within the ability of one skilled in the art to result in a satisfactory configuration. The location of such batteries are shown in FIGS. 1, 3, 4 and 6.

Figure 3:
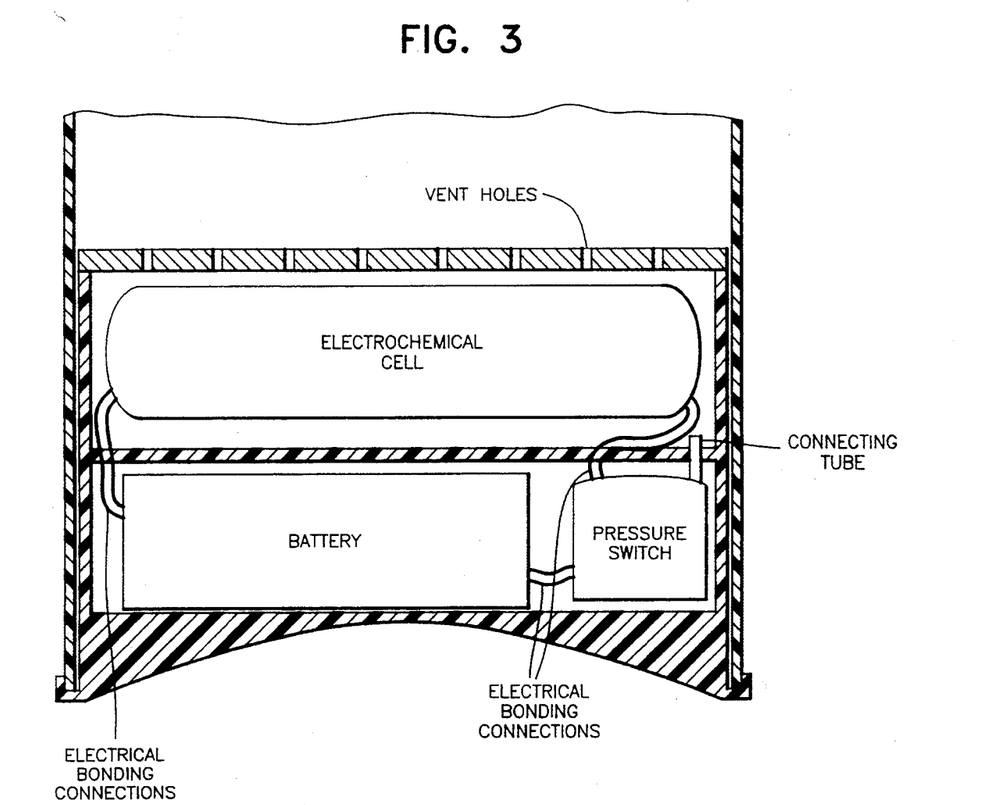
FIG. 3 shows the base of an aerosol can of the invention in cross section containing an electrolytic cell for the generation of propellant gas.

In the case of an aerosol dispenser, a pressure switch is usually used to control the application of electric current to the gas generation cell in response to changes in pressure within the container. The operation of the pressure switch creates a closed system which attempts to maintain the set-point of the pressure switch (i.e., the pressure switch opens the electrical circuit and stops gas generation when the desired pressure is reached or exceeded). Various innovative designs, including an extremely low-cost, solid-state device, may be employed. The location of such a pressure switch is shown in FIGS. 3 and 4.

Figure 2:
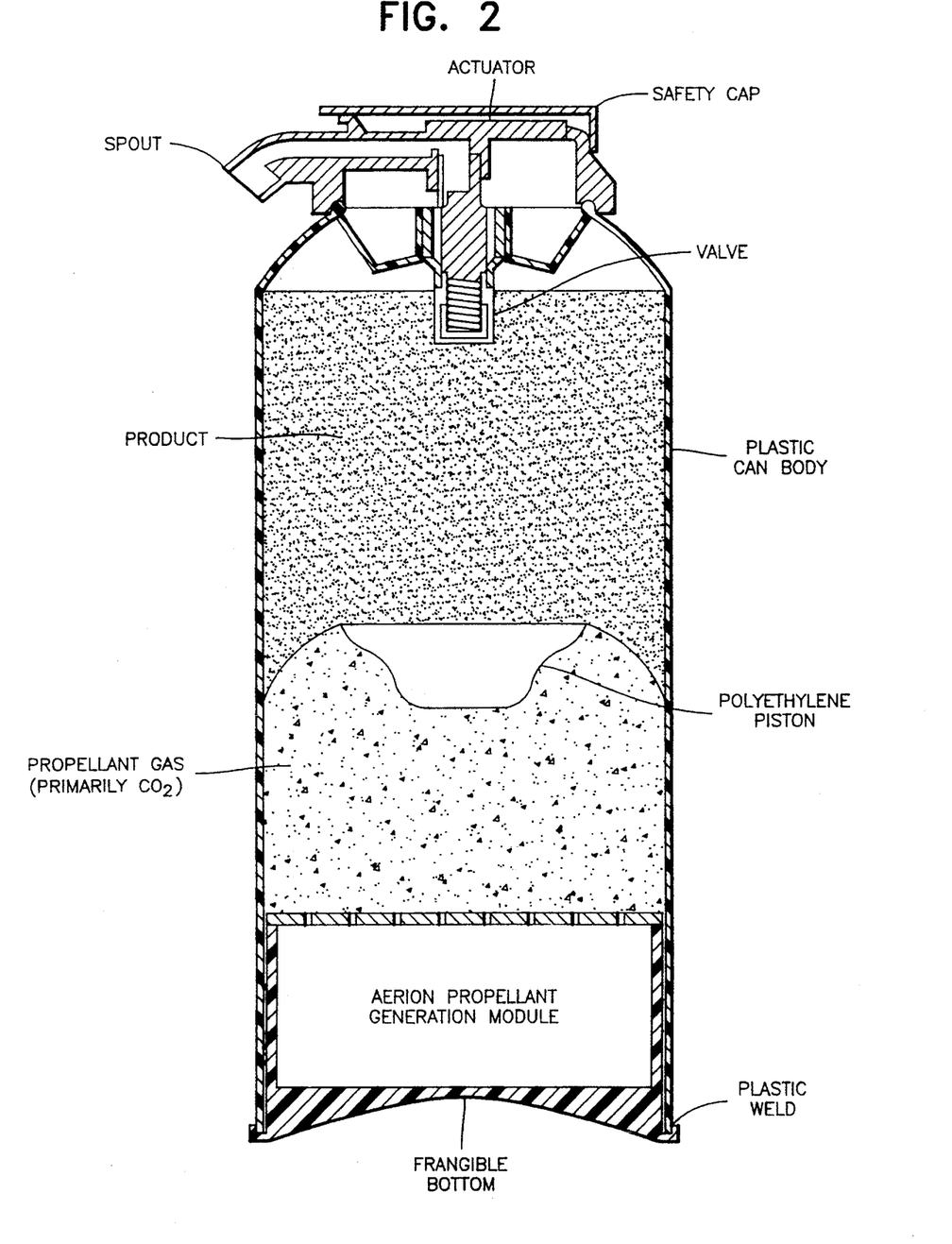
FIG. 2 shows an aerosol can of the invention in cross section.
Figure 9:
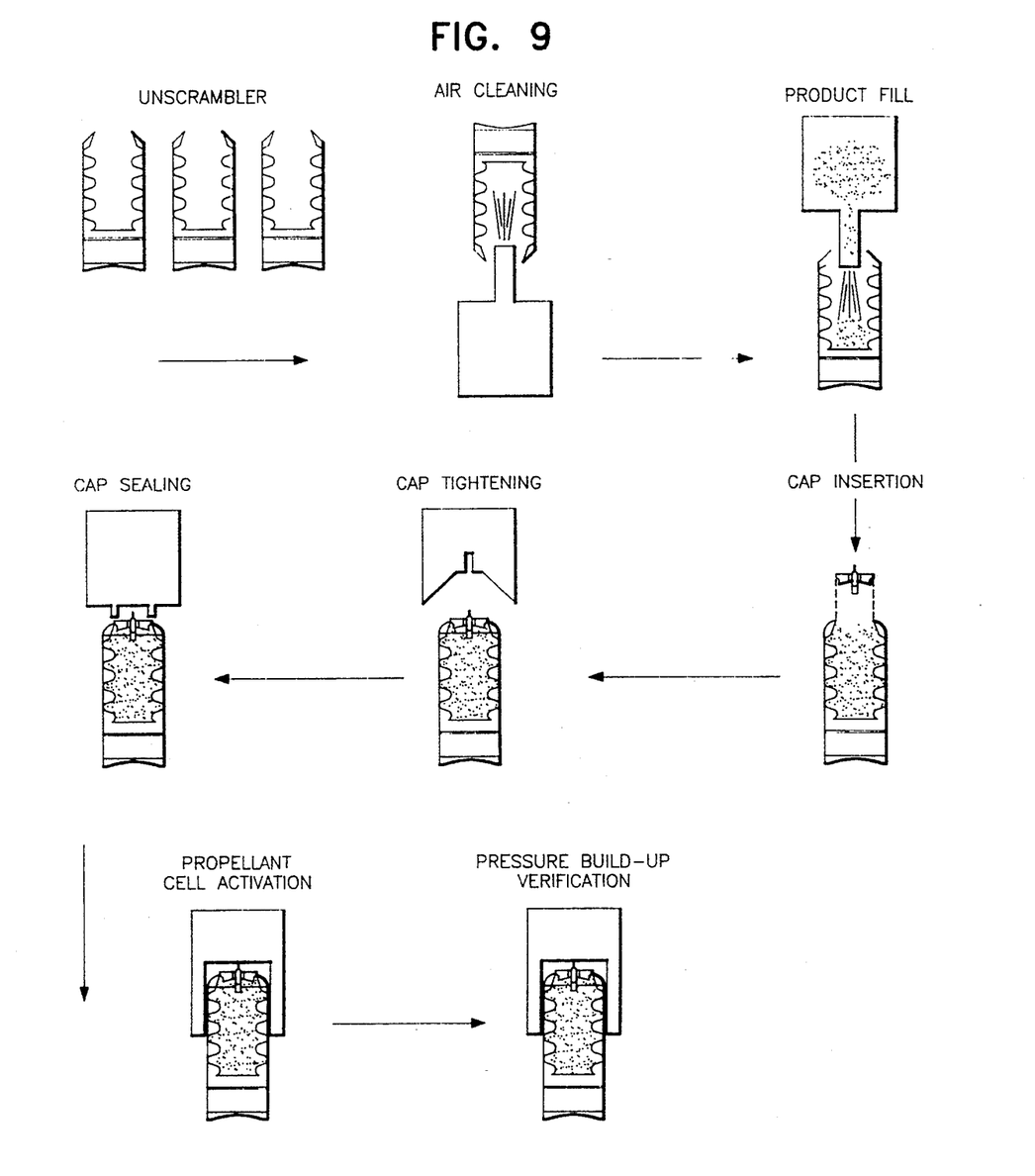
FIG. 9 shows suggested steps for filling and activating a dispensing container of the invention.

Furthermore, an activation switch may be supplied, which acts as a one-time switch to initiate the flow of electric current from the battery. The switch is in the "off" position during manufacture of the propellant gas generation module and its placement in the aerosol container, and is permanently set to the "on" position by packaging equipment after the container is filled and sealed, e.g., as shown in FIG. 9. One design of this switch consists of a thermo-sensitive plastic film separating two electrical contacts, and is operated by directing a brief burst of radio-frequency energy at the package, not unlike that provided by an induction impulse heater. Such an activation switch is generally included within the propellant generation module, as shown in FIG. 2 and may be placed in series with a pressure switch such as the pressure switch shown in FIG. 4.

There are a number of basic methods to implement the proposed gas generation process. For example, using a self-contained but discrete battery as the power source results in a totally disposable device.

An external power source such as a rechargeable battery or AC line power may also be used. In this device, the rate of delivery of the contained product is largely independent of any size or capacity constraints a self-contained battery might have.

Another embodiment of the propellant gas generation method would combine the battery and electrochemical gas generation cell in a single electrochemical cell having just two electrodes. When the circuit is completed between the two electrodes, current flows and gas generation results. This also results in a disposable device.

There are also many variations of these methodologies, as will become evident to those skilled in the art from the descriptions which follow.

With the exception of the method which requires an external power source, all of the technology for aerosol containers is implemented on a self-contained basis within the container. The method generates propellant gas on an as-needed basis from a module comprised of components as shown in FIGS. 2, 3, 4, 5 and 5A.

This is in contrast to many aerosol systems using nonbarrier type packaging, where often less than 30 percent of the propellant is actually used to expel and aerosolize the product.

The top of an aerosol package employing the module of the present invention will have a finger operated valve as shown in FIG. 2, not unlike conventional aerosol systems. Since the cell is intended to operate at lower pressures than are produced by conventional hydrocarbon gases, valve modification may be needed to adequately aerosolize certain products as understood by those skilled in the art. A valve referred to as a "mechanical breakup actuator" is an example of a design which can operate at such lower pressures.

The present invention permits a great deal of flexibility in filling containers and will use conventional multi-head filling machines with little or no modification. No specialized aerosol filling machines are needed. Methods known to those skilled in the art may be utilized. In one method, the container may be filled in an upright position using a rotary-head filler with the top end valve assembly inserted and sealed after the filling process. Since, in a proposed preferred design, the module will not be activated until after the container has been sealed, the filling process can take place at atmospheric pressure. This method is applicable to both sac-type and piston-type barrier containers. Such a method is described in FIG. 9 wherein cans containing the gas generation cell are unscrambled (oriented), cleaned with pressurized air, filled with product above the gas generation cell, capped with a cap including a dispensing valve assembly including tightening and sealing, activated by closing an activation switch, as previously discussed, e.g., using a radio frequency activated switch means, and tested for verification of pressure build-up.

In a second filling method, the container may be filled in an inverted position, with the valve already installed and the bottom open. After filling, a plastic piston is installed, followed by the container bottom, which is sealed in place. The container bottom will have a module on one side, molded so that module and bottom are one unit. The container is then returned to an upright position for placing the protective cap, and packing the container for shipment.

The propellant gas generation methods of the present invention offer a number of significant advantages over present aerosol technology. The aerosol container pressure may be accurately controlled and limited to a level low enough to permit the use of plastic or paper containers. In addition, the aerosol containers may be filled using standard rotary or multiple-head filling machinery requiring little or no modification. Furthermore, the systems can be selected so that there are no flammable propellants involved and there is no requirement for explosion-proof filling equipment and rooms. There is also no requirement for bulk storage of flammable propellants and there are no significant environmental hazards associated with the technology.

In another embodiment, the present invention may be utilized to dispense concentrated products at a controlled rate over a controlled period of time without the use of a mechanical dispensing pump, resulting in significant cost, size and reliability advantages over mechanical pump systems.

Applications of such dispensing systems for chemical concentrates include swimming pool water treatment, boiler water treatment, wastewater treatment, aquarium water control, dispensing of germicides and deodorizer products, dispensing of lubricants and dispensing of medications, among others.

As part of such dispensing systems, low cost microprocessor-based dispensing controllers may be utilized. As an example, such a controller would accept a pH electrode as an input device, and control the electrical energy input to gas generation cells of the present invention in a container of acid and/or alkali chemicals. The purpose of such a device would be to maintain a desired pH range for a controlled water system.

Figure 6:
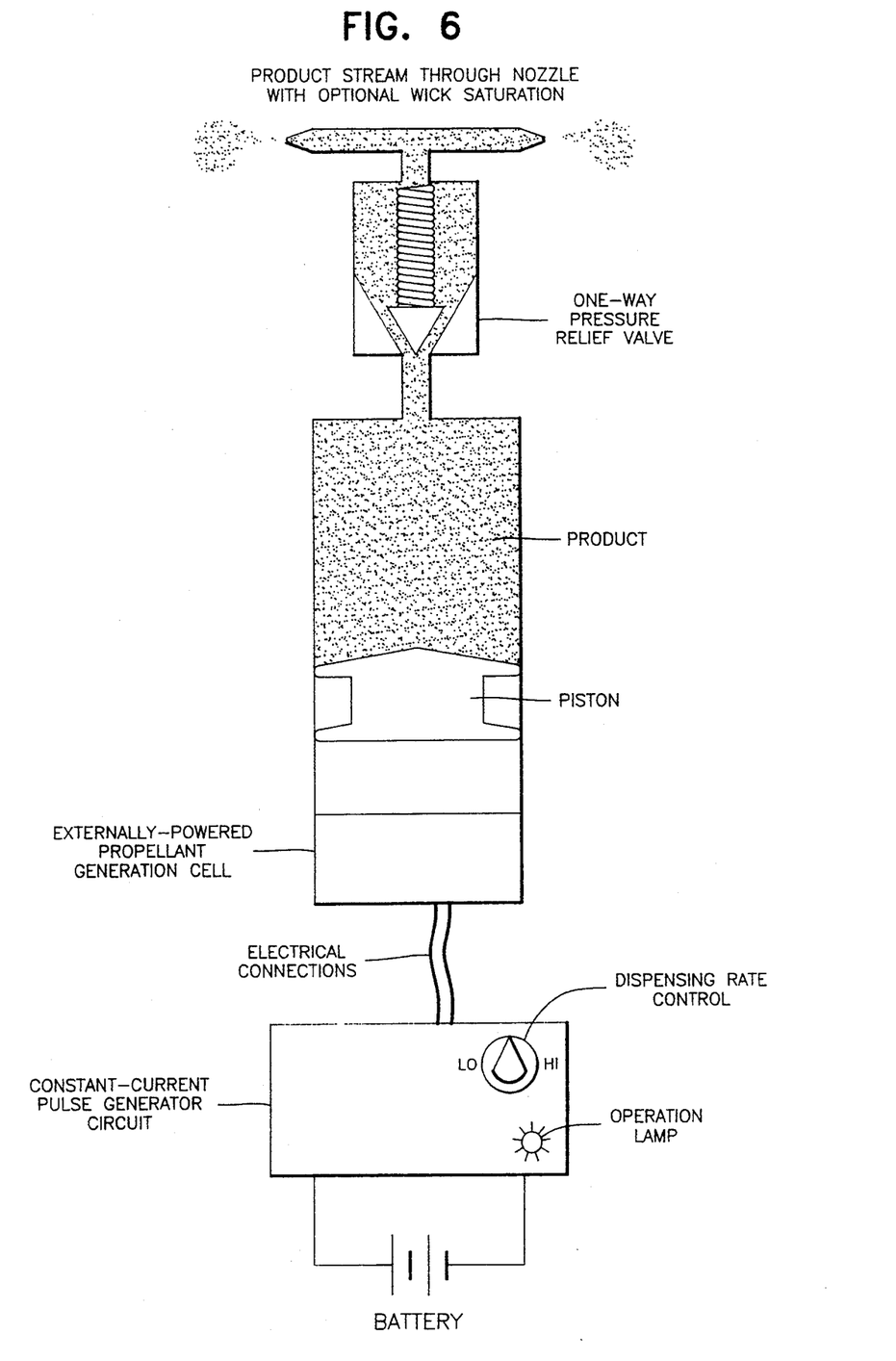
FIG. 6 shows an embodiment of a product dispensing container of the invention.
Figure 7:
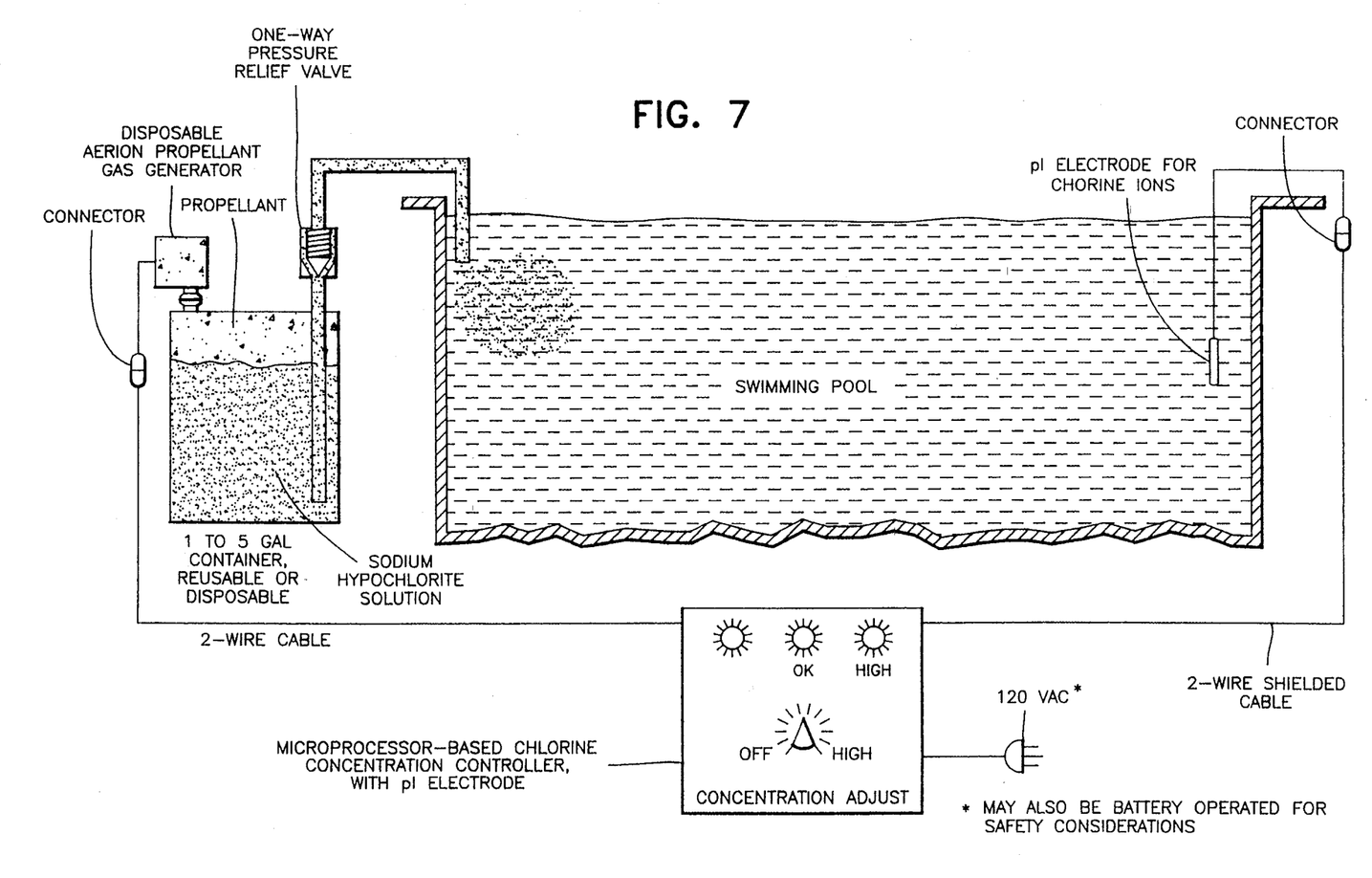
FIG. 7 shows a metering dispenser of the invention used to provide metered quantities of disinfectant to a swimming pool.

Implementation of the above technology may be done a number of ways. An example is a battery-operated device to dispense deodorizer into public rest-rooms, as shown in FIG. 6. Another example is a dispensing system for swimming pools to maintain water pH and chlorine pI, e.g., as shown in FIG. 7. Devices of the present invention may be as simple or complex as desired, e.g., the cells may be activated by simple or complex control devices or single or multiple dispensers may be incorporated.

In the particular case of the swimming pool and certain disinfecting or bleaching applications, the present propellant gas generation cell can use, as an electrolyte, the actual product being dispensed. It is also feasible to generate sodium hypochlorite solution containing fresh, free chlorine directly from common salt in a low-cost cell. Hydrogen generated may be used as the propellant in accordance with the invention. Such technology would provide an alternative to the use of purchased sodium hypochlorite.

Other embodiments of the invention will be apparent to those skilled in the art from a consideration of this specification or practice of the invention disclosed herein. It is intended that the specification and examples which follow be considered as exemplary only with the true scope and spirit of the invention being indicated by the claims.

EXAMPLE I

An electrolytic cell is made using an electrolyte comprising 60 ml of 5N aqueous acetic acid containing 5 grams of potassium acetate gelled with methyl cellulose. The electrolyte is contained within open cell urethane foam sandwiched between graphite impregnated polymer layers which act as electrodes and which are perforated to permit gas escape. The layers are wound together substantially as shown in FIG. 5. The electrolyte and electrodes are retained within a plastic gas container having at least one movable wall, e.g., in the form of a piston or flexible film. A pressure switch is provided within the gas container, physically isolated from the electrolyte and electrodes by a gas permeable wall which communicates gas under pressure to the pressure switch. The switch is connected in series with a battery, to the electrodes so that when the pressure is lower than the setting, the switch is closed thus sending current through the electrolyte to generate gas and so that when the pressure is higher than the setting on the switch, the switch is opened thus stopping current flow through the electrolyte to stop gas generation. This system usually includes an activation switch as previously described or alternatively, the container may be loaded under pressure so that the pressure switch prevents premature activation. The current density through the electrolyte using platinum electrodes of 0.4 amperes per $cm^2$ which yields 2.5 mole percent methane, 6.4 mole percent ethane and 91 mole percent carbon dioxide. The reaction produces almost 100% gas. Current efficiency is found to be 82 percent when graphite electrodes are used.

A suitable configuration for the cell is shown in FIG. 3 and the electrical diagram therefore is shown in FIG. 4.

The cell may be used to propel product from a container as shown in FIG. 2 wherein the propellant module (electrolytic cell) provides pressure upon a movable wall (polyethylene piston) which moves to force product through the valve, when the valve is opened.

Example II

A cell similar to Example I may also be externally powered, and as such may be used for automatic or semi-automatic deodorant dispensing systems for rest rooms in restaurants, commercial buildings, apartment buildings, factories and schools.

In a design such as shown in FIG. 6, a control circuit regulates the flow of electrical current from a battery to the cell. The cell generates gas which builds up pressure behind a one-way pressure relief valve. When the pressure is high enough, the deodorant is released through a nozzle. The pressure relief valve then closes and pressure begins to build again.

The control device can be set to operate continuously or only when the room is in use, either by a timing device or by responding to light in the room. Also, since the need for deodorizing is perceived more acutely in warm rooms, the control circuit could raise and lower the dispensing rate as temperature varies.

Because the present cell is so efficient at converting electrical energy into gas (95%+), the battery will last several months and will turn on a flashing light or a soft alarm as the battery nears the end of its useful life. Similarly, the control circuit will sense deodorant level in the dispenser and activate an alert when it is time to replace the container.

EXAMPLE III

A cell similar to Example I which is externally powered, can also be used to control chlorine ion concentration in swimming pools, possibly coupled with pH control. FIG. 7 shows a proposed system for controlling chlorine ion concentration.

In this design, a pI electrode for chlorine ions is connected to a microprocessor-based controller which can be set to the desired chlorine concentration. The controller regulates the flow of current to the cell. The cell releases gas to a container of sodium hypochlorite solution, propelling the solution into the swimming pool. Such a system has no moving parts in contact with the sodium hypochlorite solution to give rise to corrosion problems. The controller can be set to dispense at times when the pool is not in use, thus minimizing eye irritation. In addition, the sodium hypochlorite solution, the cell and pressure relief valve could be packaged as one convenient unit which could be slipped into a suitable dispensing container which connects easily to the system. There would be no stock of loose sodium hypochlorite crystals or tablets and no need to handle the chemical directly, so the potential for chemical burns or other accidents would be reduced. The control of the acid/alkali balance in pool water could also be managed by a similar system which could be part of the same installation.

EXAMPLE IV

Given sufficient electrical energy input to a suitably designed electrochemical propellant gas generation cell, it is possible to create dispensing pressure of 1,000 pounds per square inch or more, provided that the dispensing container is inserted into a holder which limits container expansion. Such pressures may be provided using systems as described herein wherein pressure limit switches are set to high pressures.

One application for such a device is high pressure cleaning without the use of a pump. For example, a one gallon container of cleaning compound could be inserted into a holder configured like a paint "pressure pot." A high pressure hose would exit from the product container through the top of the holder where it would connect to a reusable dispensing wand and control valve. An in-line electrically operated "flash" heater in the wand may also be incorporated to provide a heated cleaning compound.

The advantages of such a high pressure cleaning system is that there are no moving parts and no expensive high pressure piston or positive-displacement pump. The dispensing pressure is created solely by electrochemical propellant gas generation. The low cost and compact size of such a cleaning system should provide a competitive advantage over conventional high pressure cleaning methods.

The amount of propellant gas generated by the cell is known and predictable and is based on the integrated electric current or coulombs which are fed to the cell.

For dispensing systems which dispense product to an environment at or near atmospheric pressure, no feedback mechanism is necessary to determine the amount of product dispensed.

For more exacting applications, and for applications where product must be dispensed into a system presenting any significant back-pressure to the dispensing container, feedback is necessary to verify that the product is in fact being dispensed. Such feedback can take the form of a pressure switch or transducer on the product dispensing line, and/or a movable piston within the dispensing container, with the piston containing a small magnet or piece of ferrous metal, whose position is sensed using pickup coils or Hall-effect sensors. A one-way check valve may also be included on the product dispensing line to preclude the possibility of back-flow into the dispensing container.

Figure 8:
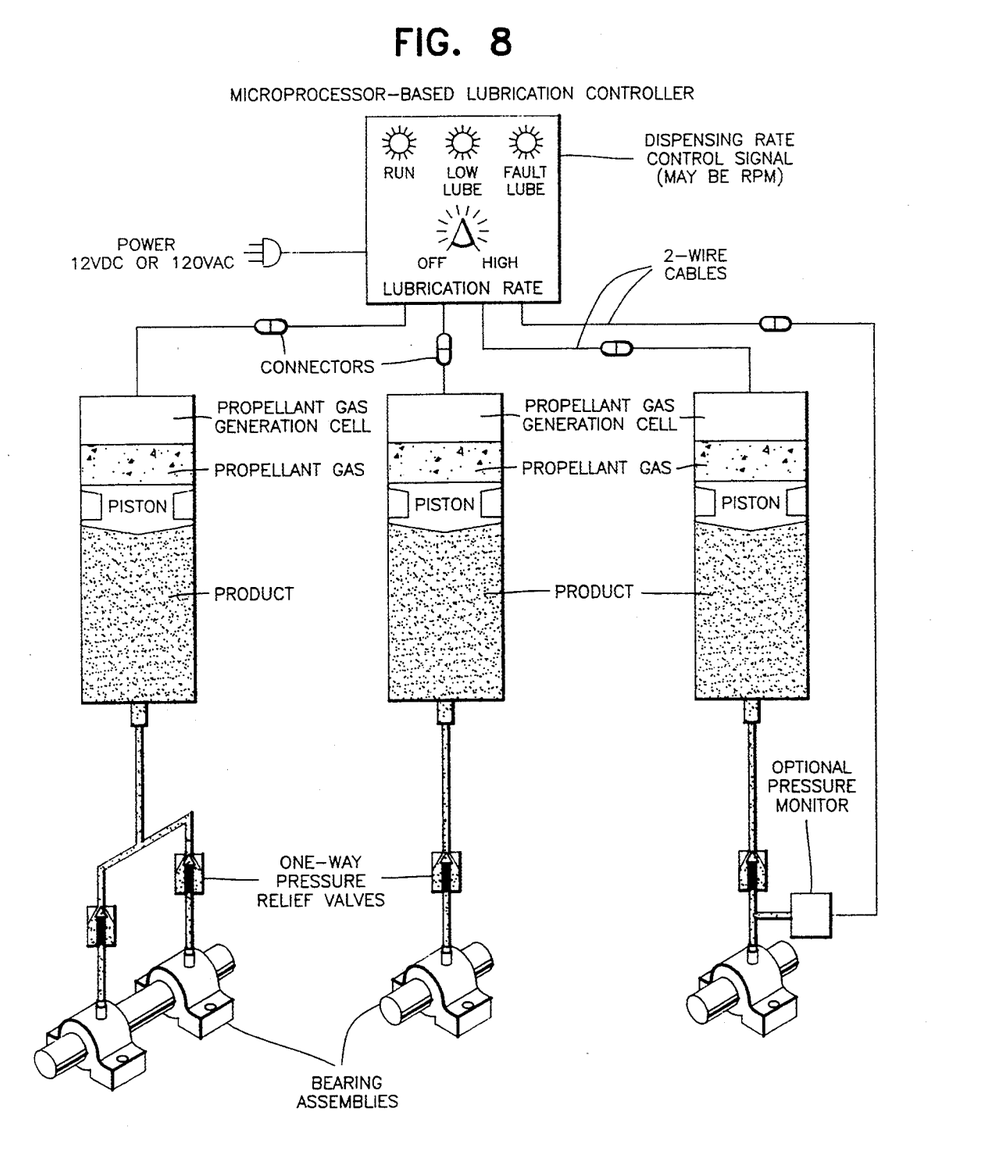
FIG. 8 shows a metering system for lubricants.

A further application of the above dispensing technology is in automatic lubrication systems for machinery and heavy vehicles. The lubricant can be packaged in a disposable container with an electrochemical propellant gas generation cell. This container would fit into a holder which allows the lubricant to attain a high pressure. Electrical current, fed to the holder, will dispense the lubricant and will develop any desired pressure. The lubricant cartridge would contain a piston having a small embedded magnet or piece of ferrous metal, thereby allowing the piston position to be electronically sensed to verify the lubricant dispensing rate. Such a system is shown in FIG. 8.

EXAMPLE V

Available battery capacity imposes a limit on the rate and duration of gas generation from the self-contained cell. A consequence of this is that the self-contained system is unsuitable for many aerosol paint applications.

An alternative embodiment which derives its electrical energy from an external source, overcomes this limitation.

This concept involves a disposable plastic container holding the product, a dispensing valve, and an electrochemical gas generation cell having electrodes which penetrate the plastic container.

This container fits into a reusable holder which contains a rechargeable battery having an ampere-hour capacity sufficient to generate propellant gas at a rate which will support continuous discharge of the contents of the container.

Transfer of electrical energy from the holder to the electrochemical cell within the container, is made either through feed-through electrodes or through an internal (and disposable) inductive pickup coil and rectifier diode.

The holder provides pressure control circuitry which senses pressure by sensing expansion of the container against the wall of the holder, thereby controlling the flow of current to the electrochemical cell in an effort to maintain constant pressure.

Since it is envisioned that the product container will fit wholly within the holder/power unit, except for the actuator valve, the container can be made of fairly thin plastic because the container walls themselves need not withstand the dispensing pressure.

Such a dispensing method may be used not only for paints and finishes but for other products such as insecticides, disinfectants, solvents and cleaning compounds where high dispensing rates may be required or preferred.

Since the disposable product container is filled and distributed at essentially atmospheric pressure, it can be made from relatively thin material and have a volume which is much greater than is practicable for conventional aerosol containers. Containers holding one or more gallons could be marketed using either a disposable or reusable hose with hand-held spray valve, since the container itself could be too large to handle and aim; not unlike some garden sprayers in concept.

Other applications for the present technology will be evident to those skilled in the art based on the disclosure heretofore and are considered to be encompassed by the present invention. Examples include a solar powered gas propulsion jet capable of giving short, measured bursts of energy for correcting the course of space vehicles and surgical implants to dispense appropriate medication in response to physiological measurements such as blood pressure, blood sugar, heart rate, temperature, etc.

What is claimed is:

1. A method for dispensing a product confined in an enclosed volume of a container, said enclosed volume having a passage in fluid communication with an atmosphere outside said container, comprising the steps of:

sensing a variable physical condition to obtain a sensed value representative of said physical condition;

electrochemically generating a non-flammable gas in response to said sensed value by passing an electrical current through an electrolyte mixture capable of reacting in the presence of said electrical current to form at least one non-flammable gas;

dispensing a product using the pressure of the electrochemically generated gas to force said confined product through said passage and outside said container; and controlling the electrochemical generation of said non-flammable gas in accordance with said sensed value by closing a switch in series with an electrical source supplying the electrical current when said sensed value reaches a first predetermined limit and opening said switch to stop formation of said electrochemically generated gas when said sensed value reaches a second predetermined limit.

2. The method of claim 1 wherein said electrolyte mixture is separated from said confined product in said container by at least one movable wall, and wherein the step of dispensing said confined product comprises applying the pressure of said gas against said movable wall to force said confined product through said passage.

3. The method of claim 1 wherein the electrolyte mixture comprises a chemical which will react in the presence of the electrical current to form carbon dioxide.

4. The method of claim 3 wherein the chemical is a carboxylic acid or a salt thereof.

5. The method of claim 4 wherein the chemical is a carboxylic acid or a salt thereof having from 2 to 10 carbon atoms.

6. The method of claim 5 wherein said electrical current passed through said electrolyte mixture has a current density of 0.15 to 0.3 ampere per $cm^2$ and is provided at an electrical potential of at least 2.1 volts.

7. The method of claim 4 wherein said electrolyte mixture further comprises an alkali carboxylate.

8. The method of claim 7 wherein said electrolyte mixture further comprises from 4N to 6N aqueous acetic acid and from 2 to 6 percent by weight alkali metal acetate.

9. The method of claim 3 wherein said electrolyte mixture comprises from 2 to 10 percent by weight alkali metal acetate, an electrocatalyst and an anion selected from the group consisting of bicarbonate, dihydrogen phosphate, fluoride and sulfate.

10. The method of claim 3 wherein said electrolyte mixture further comprises a gelling agent.

11. The method of claim 3 wherein said chemical is a member selected from the group consisting of dicarboxylic acids, dicarboxylic acid salts, hydroxy acids and hydroxy acid salts.

12. The method of claim 3 wherein said chemical is an aromatic acid or an aromatic acid salt.

13. The method of claim 3 wherein said electrolyte mixture further comprises an electrocatalyst.

14. The method of claim 1 wherein the electrolyte mixture comprises a chemical which will react in the presence of an electrical current to form nitrogen.

15. The method of claim 1 wherein the electrolyte mixture comprises a chemical which will react in the presence of an electrical current to form chlorine.

16. The method of claim 1 wherein said electrolyte mixture comprises at least two chemicals which will react in the presence of an electrical current to form a gas.

17. The method of claim 1 wherein said electrolyte mixture further comprises methanol or a mixture of methanol and water.

18. A method for dispensing a product confined in an enclosed volume of a container, said enclosed volume having a passage in fluid communication with an atmosphere outside said container, comprising the steps of:
sensing a pressure of an electrochemically generated gas to obtain a sensed value representative of said pressure;
electrochemically generating gas in response to said sensed value by passing an electrical current through an electrolyte mixture capable of reacting in the presence of said electrical current to form at least one gas;
dispensing a product using the pressure of the electrochemically generated gas to force said confined product through said passage and outside said container; and
controlling the electrochemical generation of said gas in accordance with said sensed value by closing a switch in series with an electrical source supplying the electrical current when the pressure of said electrochemically generated gas falls below a minimum predetermined limit and opening said switch to stop formation of said electrochemically generated gas when said pressure of said electrochemically generated gas exceeds a maximum predetermined limit.

19. The method of claim 18 wherein said maximum predetermined limit is from 10 to 1000 psi and said minimum predetermined limit is less than 10 percent lower than said maximum predetermined limit.

20. An apparatus for dispensing a product comprising:
a container with a dispensable product therein;
means for electrochemically generating a gas comprising an electrolyte mixture capable of reacting in the presence of an electrical current to form at least one gas and means for passing an electrical current through said electrolyte mixture to form said gas;
means for dispensing said product from said container using the pressure of a gas generated by said electrochemical gas generation means; and
means for controlling said electrochemical gas generation means in accordance with a sensed value of a variable physical condition, said control means comprising a pressure switch provided in series with a means for supplying electrical current, said pressure switch sensing the pressure of the electrochemically generated gas to provide said sensed value, wherein said pressure switch closes to supply current to the electrolyte mixture to generate gas when the pressure of said electrochemically generated gas falls below a minimum predetermined level and opens to interrupt the flow of said electrical current when the pressure of said electrochemically generated gas exceeds a maximum predetermined level.

21. An apparatus for dispensing a product comprising:
a container with a dispensable product therein;
means for sensing a variable physical condition to obtain a sensed value representing said physical condition;
means for electrochemically generating a non-flammable gas comprising an electrolyte mixture capable of reacting in the presence of an electrical current to form at least one non-flammable gas and means for passing an electrical current through said electrolyte mixture to form at least one non-flammable gas;
means for dispensing said product from said container using the pressure of a non-flammable gas generated by said electrochemical gas generation means; and
means for controlling said electrochemical gas generation means in accordance with said sensed value, said control means comprising a switch in series with a means for supplying the electrical current, said control means closing said switch to supply the electrical current to the electrolyte mixture to generate gas when said sensed value reaches a first predetermined limit and opening said switch to interrupt the flow of said electrical current when said sensed value reaches a second predetermined limit.

22. The apparatus of claim 21 wherein the means for dispensing said product comprises at least one movable wall which physically separates said confined gas and said product, said wall being movable against the product by pressure of the gas.

23. The apparatus of claim 21 wherein said means for electrochemically generating a non-flammable gas comprises said electrolyte mixture within a gel.

* * * * *